(12) United States Patent
Keefe et al.

(10) Patent No.: US 9,083,683 B2
(45) Date of Patent: Jul. 14, 2015

(54) ENCRYPTION/DECRYPTION DEVICE FOR SECURE COMMUNICATIONS BETWEEN A PROTECTED NETWORK AND AN UNPROTECTED NETWORK AND ASSOCIATED METHODS

(75) Inventors: Richard John Keefe, North Chili, NY (US); Robert Jeffery White, Ellicott City, NY (US); Gary Roger Dennis, Rochester, NY (US)

(73) Assignee: HARRIS CORPORATION, Melbourne, FL (US)

( * ) Notice: Subject to any disclaimer, the term of this patent is extended or adjusted under 35 U.S.C. 154(b) by 1574 days.

(21) Appl. No.: 11/668,591

(22) Filed: Jan. 30, 2007

(65) Prior Publication Data

US 2008/0181394 A1 Jul. 31, 2008

(51) Int. Cl.
G06F 12/14 (2006.01)
H04L 29/06 (2006.01)
H04L 12/22 (2006.01)

(52) U.S. Cl.
CPC ............ *H04L 63/0485* (2013.01); *H04L 12/22* (2013.01)

(58) Field of Classification Search
USPC ............................................ 380/28; 713/192
See application file for complete search history.

(56) References Cited

U.S. PATENT DOCUMENTS

| | | | |
|---|---|---|---|
| 6,052,600 A | 4/2000 | Fette et al. | 455/186 |
| 6,785,556 B2 | 8/2004 | Souissi | 455/557 |
| 6,823,069 B1 * | 11/2004 | Kitajima et al. | 380/44 |
| 6,876,864 B1 | 4/2005 | Chapin | 455/509 |
| 7,016,668 B2 | 3/2006 | Vaidyanathan et al. | 455/418 |
| 7,151,925 B2 | 12/2006 | Ting et al. | 455/419 |
| 7,177,590 B1 | 2/2007 | Stevens | 455/3 |
| 7,380,124 B1 * | 5/2008 | Mizell et al. | 713/171 |
| 7,404,074 B2 | 7/2008 | Murotake | 713/100 |

(Continued)

FOREIGN PATENT DOCUMENTS

GB 2357019 6/2001
WO 2004114047 12/2004

OTHER PUBLICATIONS

Harris Assured Communications internet article, "Networks Should be as Mobile as you Are", Mar. 1, 2006.

(Continued)

*Primary Examiner* — Amare F Tabor
(74) *Attorney, Agent, or Firm* — Allen, Dyer, Doppelt, Milbrath & Gilchrist, P.A.

(57) ABSTRACT

The encryption/decryption device includes a plaintext unit, a ciphertext unit and a cryptographic unit connected therebetween. The plaintext unit may include a logic device such as a first programmable logic device (PLD), e.g. a field programmable gate array (FPGA), for interfacing with the protected network to perform encapsulation of data from the protected network to define outgoing datagrams, and to perform decapsulation of incoming datagrams from the cytographic unit. The ciphertext unit may include a second logic device such as a PLD or FPGA for interfacing with the unprotected network to perform routing of incoming encrypted datagrams from the unprotected network to the cryptographic unit, and to perform routing of outgoing encrypted datagrams from the cryptographic unit to the unprotected network. The cryptographic unit may also be a PLD or FPGA and performs encryption of outgoing datagrams from the plaintext unit, and to perform decryption of incoming encrypted datagrams from the ciphertext unit to define the incoming datagrams.

13 Claims, 5 Drawing Sheets

(56) References Cited

U.S. PATENT DOCUMENTS

| | | | |
|---|---|---|---|
| 2002/0191790 A1* | 12/2002 | Anand et al. | 380/255 |
| 2003/0028650 A1 | 2/2003 | Chen et al. | |
| 2004/0022390 A1* | 2/2004 | McDonald et al. | 380/277 |
| 2005/0058122 A1 | 3/2005 | Anspach | |
| 2005/0076228 A1* | 4/2005 | Davis et al. | 713/188 |
| 2005/0108382 A1 | 5/2005 | Murotake et al. | 719/320 |
| 2006/0256817 A1* | 11/2006 | Durst | 370/466 |
| 2007/0074046 A1* | 3/2007 | Czajkowski et al. | 713/190 |
| 2008/0141333 A1* | 6/2008 | Chen et al. | 726/1 |

OTHER PUBLICATIONS

Mirhakkak et al., "Modeling and Simulation of Haipe", MILCOM 2006, Oct. 2006, pp. 1-7.

* cited by examiner

ENCRYPTION/DECRYPTION DEVICE FOR SECURE COMMUNICATIONS BETWEEN A PROTECTED NETWORK AND AN UNPROTECTED NETWORK AND ASSOCIATED METHODS

FIELD OF THE INVENTION

The present invention relates to the field of network communications, and, more particularly, to secure network communications and related methods.

BACKGROUND OF THE INVENTION

Security may be an important consideration in network communications. With the ever-increasing utilization of the Internet, most networks now have Internet gateways that open the network to external attacks by would-be hackers. Further, the popularity of wireless networks has also increased dramatically as technology has enabled faster and more reliable wireless communications. Yet, wireless communications are inherently less secure than wired communications, since wireless communication signals are typically much easier to intercept than signals on difficult-to-access cables.

As a result, cryptography modules are often used to encrypt private or secret communications and reduce the likelihood that they will be deciphered and used by malicious individuals or organizations. By way of example, wireless local area networks (WLANs) and WLAN devices are widely used and provide a convenient and cost-effective approach for implementing network communications where it may be difficult or otherwise impractical to run cables. One of the more prominent standards which has been developed for regulating communications within WLANs is promulgated by the Institute of Electrical and Electronic Engineers' (IEEE) 802 LAN/MAN Standards Committee, including the 802.11 standard. In addition to providing wireless communications protocols, the 802.11 standard also defines a wireless equivalent privacy (WEP) cryptographic algorithm used to protect wireless signals from eavesdropping.

IPsec (IP security) is a standard for securing Internet Protocol (IP) communications by encrypting and/or authenticating all IP packets. IPsec provides security at the network layer.

IPsec is a set of cryptographic protocols for (1) securing packet flows and (2) key exchange. Of the former, there are two: Encapsulating Security Payload (ESP) provides authentication, data confidentiality and message integrity; Authentication Header (AH) provides authentication and message integrity, but does not offer confidentiality. Originally AH was only used for integrity and ESP was used only for encryption; authentication functionality was added subsequently to ESP. Currently only one key exchange protocol is defined, the IKE (Internet Key Exchange) protocol.

IPsec protocols operate at the network layer, layer 3 of the OSI model. Other Internet security protocols in widespread use, such as SSL and TLSr operate from the transport layer up (OSI layers 4-7). This makes IPsec more flexible, as it can be used for protecting both TCP and UDP-based protocols, but increases its complexity and processing overhead, as it does not rely on TCP (layer 4 OSI model) to manage reliability and fragmentation.

HAIPE (High Assurance Internet Protocol Encryptor) is the United States Department of Defense's analog of IPsec. HAIPE inline network encryptors (INE) exist today predominately in the form of software-based network stacks. In this architecture, all of the HAIPE functions, including traffic encapsulation that provides the security cover, are performed by layers of software within a processor. With current technology, it is not feasible to perform the encapsulation operations in a software stack at data rates beyond a few million bits per second.

Some methods of hardware acceleration exist to improve certain IP datagram processing operation. These methods include IP and higher (TCP, UDP) layer header checksum calculations and route table searches. Additional architecture variations make use of specialized network processors (NP) to partition the IP and higher layer operations. This approach uses fixed building blocks within a monolithic device and programmers model to process the datagram.

SUMMARY OF THE INVENTION

In view of the foregoing background, it is therefore an object of the present invention to provide increased data rate processing for encryption/decryption devices for secure communications between a protected network and an unprotected network.

This and other objects, features, and advantages in accordance with the present invention are provided by an encryption/decryption device for secure communications between a protected network and an unprotected network, and including one or more logic devices such as Programmable Logic Devices (PLDs), field programmable gate arrays (FPGAs) and/or application specific integrated circuits (ASICs). The encryption/decryption device may include a plaintext unit, a ciphertext unit and a cryptographic unit connected therebetween. The plaintext unit may include a first PLD, such as a field programmable gate array (FPGA) for interfacing with the protected network to perform encapsulation of data from the protected network to define outgoing datagrams, and to perform decapsulation of incoming datagrams from the cytographic unit. The ciphertext unit may include a second PLD or FPGA for interfacing with the unprotected network to perform routing of incoming encrypted datagrams from the unprotected network to the cryptographic unit, and to perform routing of outgoing encrypted datagrams from the cryptographic unit to the unprotected network. The cryptographic unit may also be a PLD or FPGA and performs encryption of outgoing datagrams from the plaintext unit, and to perform decryption of incoming encrypted datagrams from the ciphertext unit to define the incoming datagrams. The datapath architecture of the present invention performs the encapsulation operations in a series of PLDs, such as high speed FPGAs, at data rates above a few million bits per second.

A plaintext unit input/output processor may control the plaintext unit, a ciphertext unit input/output processor may control the ciphertext unit, and a cryptographic unit control processor may control the cryptographic unit. The device may include a plaintext unit network interface to interface the plaintext unit with the protected network, and a ciphertext unit network interface to interface the ciphertext unit with the unprotected network.

The plaintext unit may include an egress directional component to perform the encapsulation of data from the protected network to define the outgoing datagrams, and an ingress directional component to perform the decapsulation of the incoming datagrams from the cytographic unit. Similarly, the ciphertext unit may include an ingress directional component to perform the routing of incoming encrypted datagrams from the unprotected network to the cryptographic unit, and an egress directional component to perform routing of outgoing encrypted datagrams from the cryptographic unit to the unprotected network.

Each of the first and second PLDs may comprise a field-programmable gate array (FPGA) and the cryptographic unit may comprise a third FPGA. The plaintext unit, ciphertext unit and cryptographic unit may operate in accordance with the High Assurance Internet Protocol Interoperability Specification (HAIPIS).

A method aspect is directed to making an encryption/decryption device for secure communications between a protected network and an unprotected network. The method may include providing a plaintext unit, providing a ciphertext unit, and connecting a cryptographic unit between the plaintext unit and the ciphertext unit. Providing the plaintext unit may comprise providing a first programmable logic device (PLD), e.g. an FPGA, for interfacing with the protected network to perform encapsulation of data from the protected network to define outgoing datagrams, and to perform decapsulation of incoming datagrams from the cytographic unit. Providing the ciphertext unit may comprise providing a second PLD, e.g. an FPGA, for interfacing with the unprotected network to perform routing of incoming encrypted datagrams from the unprotected network to the cryptographic unit, and to perform routing of outgoing encrypted datagrams from the cryptographic unit to the unprotected network. Furthermore, connecting the cryptographic unit may include providing the cryptographic unit, such as an FPGA, to perform encryption of outgoing datagrams from the plaintext unit, and to perform decryption of incoming encrypted datagrams from the ciphertext unit to define the incoming datagrams.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The primary job of the Internet Protocol (IP) is the delivery of data between devices over an internetwork. On its journey between two hosts in an internet, this data may travel across many physical networks. To help ensure that the data is sent and received properly, it is encapsulated within a message called an IP datagram. This datagram may include several fields that help manage the operation of IP and ensure that data gets where it needs to go.

A datagram is a self-contained, independent entity of data carrying sufficient information to be routed from the source to the destination computer without reliance on earlier exchanges between this source and destination computer and the transporting network. The term is used in several well-known communication protocols, including the User Datagram Protocol (UDP). A very similar term, packet, is used in the Internet Protocol (IP) and other protocols related to the Internet. A datagram or packet should be self-contained without reliance on earlier exchanges because there is no connection of fixed duration between the two communicating points.

As in other network protocol messages, IP uses a specific format for its datagrams. For example, the IPv4 datagram is conceptually divided into two pieces: the header and the payload. The header contains addressing and control fields, while the payload carries the actual data to be sent over the internetwork, as would be appreciated by those skilled in the art.

Inline Network Encryptors (INE), provide privacy for all traffic leaving a network by encrypting the traffic. Once a secure user operates under a security device, such as an INE, that user can only communicate with other users with similar security devices or INEs with the same encryption/decryption keys.

Described herein is an architecture for high speed processing of IP network traffic. The particular processing described refers to the Internet security service defined as High Assurance IP Encryptor (HAIPE). This method has been formally specified by the High Assurance Internet Protocol Interoperability Specification (HAIPIS). The approach of the present invention may also be applicable to other IP security communications.

HAIPIS dictates how to apply IP security (IPSEC) with type I encryption. From the HAIPIS, "The HAIPE device is an Information Security (INFOSEC) device designed to provide security services for IP datagram traffic for tactical and strategic network applications." IPSEC is specified in RFC2401, "Security Architectures for the Internet Protocol".

In support of that objective, a HAIPE device uses the encapsulating security payload (ESP), tunnel mode of IPSEC. In general, this mode secures datagrams by encrypting the original IP datagram, and encapsulating that encrypted datagram within a separate, high reliability datagram. In conjunction with this, the HAIPE device performs a number of network management functions, including dynamic host discovery (ascertaining the presence of compatible HAIPE devices with which it can establish a connection), automated key exchange amongst the compatible devices and establishment of security associations (SA) used to characterize the ESP tunnel.

HAIPE devices exist today predominately in the form of software-based network stacks. That is, layers of software within a processor's operating system (OS) perform the HAIPE functions. With current technology, it is not feasible to perform the encapsulation operations in an embedded processor's software stack at data rates beyond a few million bits per second.

The datapath architecture described herein performs these data path operations in a series of logic devices (LDs) such as programmable logic devices (PLDs) or high speed field programmable gate arrays (FPGAs) and/or application specific integrated circuits (ASICs). This series includes, for example, red (plaintext), crypto (cryptographic) and black (ciphertext) datapath FPGAs. Each of these datapath FPGA functions interface to an associated input/output (I/O) control processor. The Red/Black concept refers to the careful segregation in cryptographic systems of signals that contain sensitive or classified plaintext information (Red signals) from those that carry encrypted information, or ciphertext (Black signals).

A field programmable gate array (FPGA) is a semiconductor device containing programmable logic components and programmable interconnects. The programmable logic components can be programmed to duplicate the functionality of basic logic gates such as AND, OR, XOR, NOT or more complex combinational functions such as decoders or simple math functions. In most FPGAs, these programmable logic components (or logic blocks) also include memory elements, which may be simple flip-flops or more complete blocks of memories.

Figure 1:
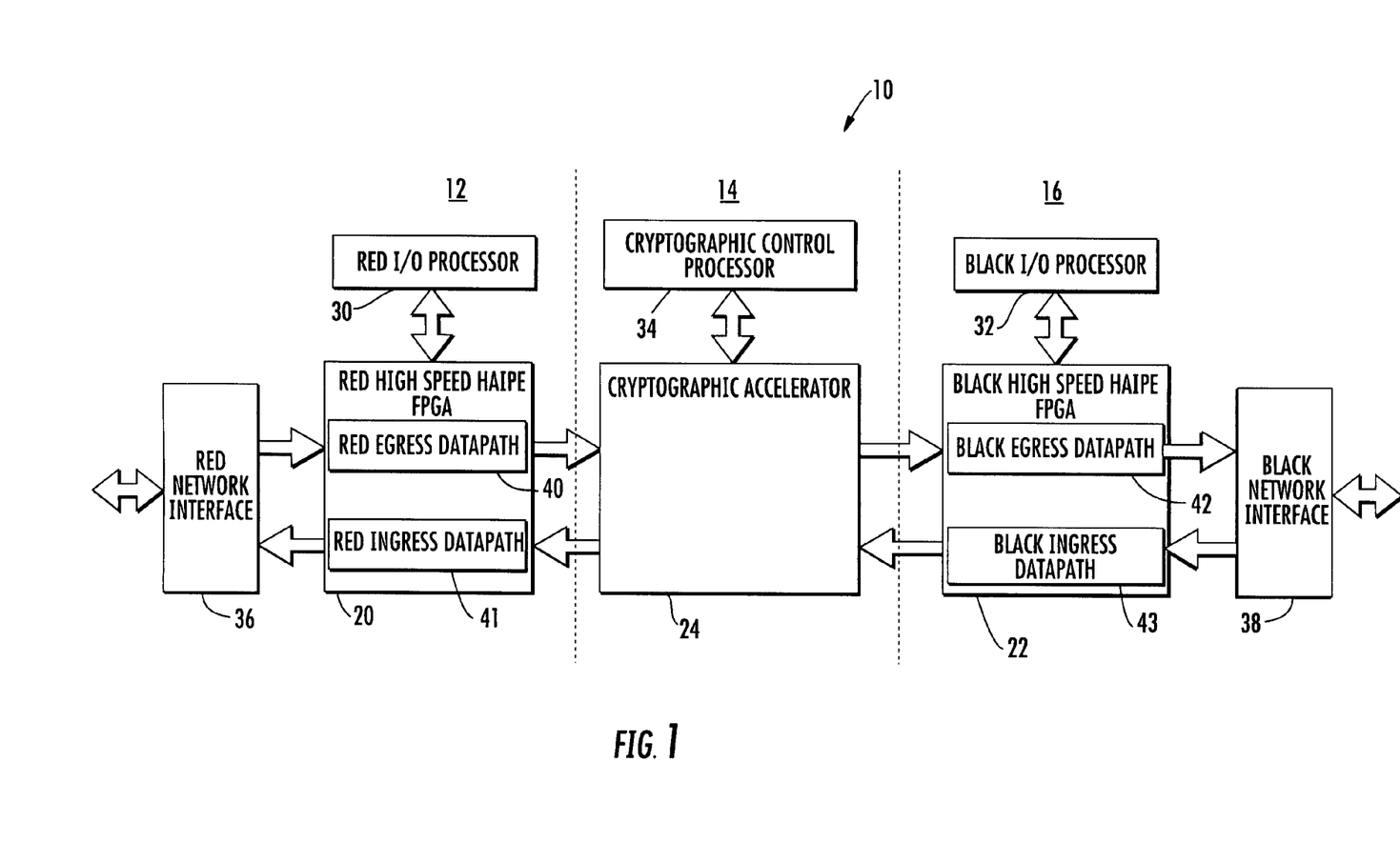
FIG. 1 is a schematic block diagram illustrating an encryption/decryption device for secure communications between a protected network and an unprotected network in accordance with the present invention.

Referring now to FIG. 1, an encryption/decryption device 10 for secure communications between a protected network and an unprotected network will now be described. The device 10 includes a red or plaintext unit 12, a black or ciphertext unit 16 and a cryptographic unit 14 connected therebetween. The plaintext unit 12 may include a logic device such as a first programmable logic device (PLD) 20, or an FPGA or ASIC, for interfacing with the protected network to perform encapsulation of data from the protected network to define outgoing datagrams, and to perform decapsulation of incoming datagrams from the cytographic unit 14.

The ciphertext unit 16 may include a second logic device such as PLD 22, or an FPGA or ASIC, for interfacing with the unprotected network to perform routing of incoming encrypted datagrams from the unprotected network to the cryptographic unit 14, and to perform routing of outgoing encrypted datagrams from the cryptographic unit to the unprotected network. The cryptographic unit 14 may also include a PLD 24 or FPGA and performs encryption of outgoing datagrams from the plaintext unit 12, and to perform decryption of incoming encrypted datagrams from the ciphertext unit 16 to define the incoming datagrams.

A plaintext unit input/output processor 30 may control the plaintext unit 12, a ciphertext unit input/output processor 32 may control the ciphertext unit 16, and a cryptographic unit control processor 34 may control the cryptographic unit 14. The device 10 may include a plaintext unit network interface 36 to interface the plaintext unit 12 with the protected network, and a ciphertext unit network interface 38 to interface the ciphertext unit 16 with the unprotected network.

The plaintext unit 12 may include an egress directional component 40 to perform the encapsulation of data from the protected network to define the outgoing datagrams, and an ingress directional component 41 to perform the decapsulation of the incoming datagrams from the cytographic unit 14. Similarly, the ciphertext unit 16 may include an ingress directional component 43 to perform the routing of incoming encrypted datagrams from the unprotected network to the cryptographic unit 14, and an egress directional component 42 to perform routing of outgoing encrypted datagrams from the cryptographic unit 14 to the unprotected network.

As discussed above, the plaintext unit 12, ciphertext unit 16 and cryptographic unit 14 may operate in accordance with the High Assurance Internet Protocol Interoperability Specification (HAIPIS). However, the approach of the present invention may also be applicable to other IP security communications.

Figure 2:
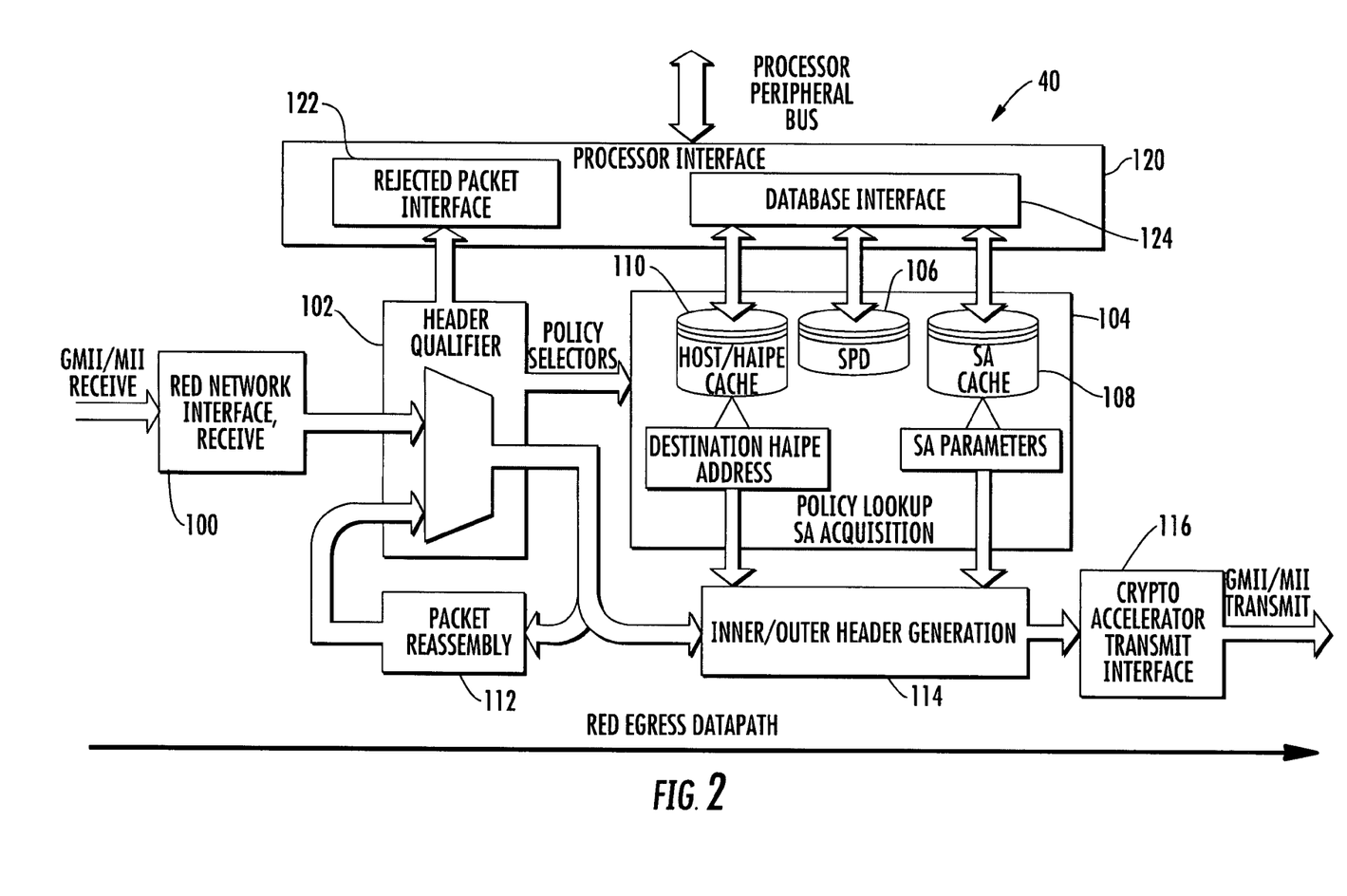
FIG. 2 is a schematic block diagram illustrating features of the egress datapath of the plaintext or red unit of the encryption/decryption device of FIG. 1.
Figure 3:
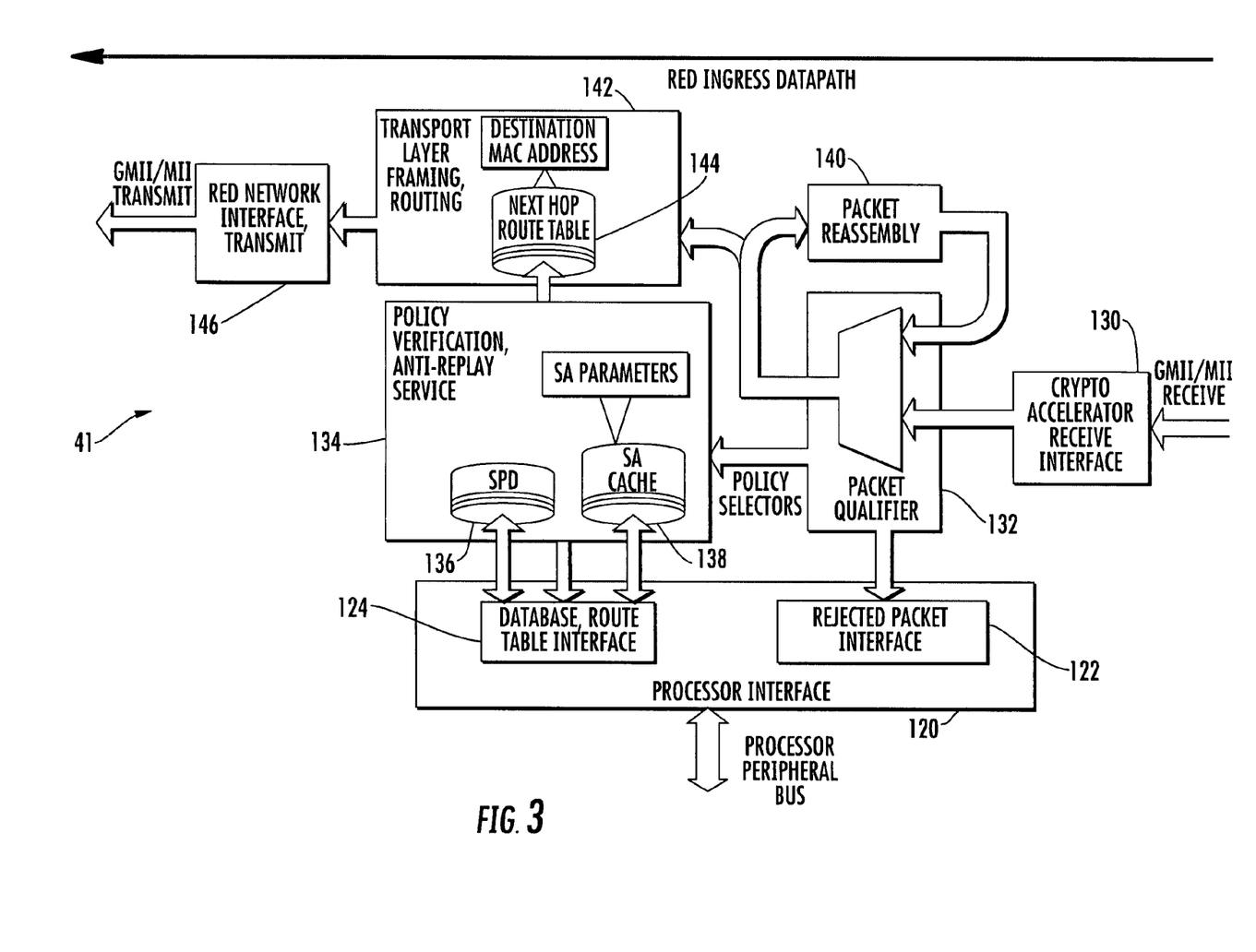
FIG. 3 is a schematic block diagram illustrating features of the ingress datapath of the plaintext or red unit of the encryption/decryption device of FIG. 1.

Referring now to FIGS. 2 and 3, various features of an embodiment of the egress and ingress datapaths of the red or plaintext unit 12 of the encryption/decryption device 10 of FIG. 1 will now be described. The red unit 12 includes an associated interface 100 to the red or protected network to perform the encapsulation of outgoing datagrams (creation of a new IP header) and the decapsulation of incoming datagrams. Both of these operations may include the red unit 12 comparing the characteristics of the datagram against security policies and security associations to assure that the datagrams qualify for propagation. The red unit 12 also performs many of the IP routing and Ethernet framing functions needed to propagate the datagrams to the intended host device.

For example, the red unit 12 may perform HAIPE version 1.3.5 datagram encapsulation at data rates well suited for its use as a fronting HAIPE device for a local area network of hosts. The red unit 12 is governed by the red I/O processor (RIOP) 30. Collectively, these blocks may define the red-side HAIPE processing operation.

As discussed above, the red unit 12 may include both ingress and egress directional components 40/41 in a full duplex configuration. Each directional component may have its own set of independent components. The red unit egress directional component group or datapath 40 performs cipher text (CT) and ESP encapsulation of red IP datagrams outbound from the red protected network toward the unprotected network. The sub-components of the red unit egress directional component or datapath 40 will now be described.

A Packet Qualifier or Header Qualifier 102 scans the header field of the outbound red IP datagram to ensure that the packet is a traffic packet of the proper type, and forwards to the RIOP 30 any packets that are of a type that do not qualify for continued processing, e.g. HAIPE processing in the example. Processor interface 120 illustratively includes a rejected packet interface 122 and database interface 124. A Policy Engine or Policy Lookup SA Acquisition 104 includes the security policy database (SPD) 106 and a cached subset of the security association (SA) database 108. The policy engine 104 uses the red outbound datagram header fields to check the datagram against the security policy and then acquires the SA used to build inner and outer tunnel headers. In case of a policy mismatch or SA cache miss, the policy engine informs the RIOP 30 which works to establish a new SA. A Host Cache 110 is also included.

A reassembly controller or packet reassembly block 112 reassembles outbound fragments as needed prior to encryption processing. An ESP encapsulation block or inner/outer header generation block 114 builds the inner and outer header and trailer fields according to the parameters from the acquired SA, and fragments datagrams that exceed the MTU size of the tunnel. The Crypto Accelerator Transmit Interface 116 forwards the encapsulated outgoing datagrams to the cryptographic unit 14.

The red unit ingress directional component group or datapath 41 performs decapsulation of ESP datagrams inbound from the unprotected black network toward the protected red network. The sub-components of the red unit ingress directional component or datapath 41 will now be described.

A Packet Qualifier 132 scans the header field of the inbound red IP datagram, received via the Crypto Accelerator Receive Interface 130, to ensure that the packet has been authenticated after decryption, and forwards to the RIOP 30, via Processor interface 120, any packets that are of a type that do not pre-qualify for encryption processing. A Policy Engine or Policy Verification Anti-Replay Service block 134 contains the security policy database (SPD) 136 and a cached subset of the security association (SA) database 138. The policy engine 134 uses the red inbound datagram header fields to check the datagram against the security policy and that the packet was received through an authorized SA, and also performs replay analysis of the packet. In case of a policy mismatch or SA cache miss, the policy engine 134 informs the RIOP 30 which then operates to establish a new SA.

A Reassembly controller or Packet Reassembly block 140 reassembles inbound fragments as needed prior to encryption processing. A transport encapsulation block or Transport Layer Framing Routing block 142 includes a next hop route lookup table 144 and Ethernet framing of red inbound PT IP datagrams before being forwarded to the Red Network Interface, Transmit block 146. Since the directional components may be contained within a common framework, e.g. a monolithic red HAIPE FPGA, they may share some resources. The shared resources include: the Processor Interface 120 which provides a common RIOP interface to both the egress and ingress sections 40/41; and an Ethernet media access controller (MAC) Interface, e.g. defined by interface blocks 100, 116, 130 and 146, comprising a dual-channel Ethernet MAC (EMAC) in which each channel contains a full duplex, tri-mode EMAC, for example. One channel serves the interface to the red protected network while the other serves the interface to the cryptographic accelerator unit 14.

The cryptographic unit 14 or cryptographic accelerator FPGA resides between the red and black units 12/16 and performs the red outgoing datagram encryption and incoming decryption. The black unit 16 contains includes an associated interface 38 to the black network and performs black IP routing, Ethernet framing and rudimentary security functions on incoming datagrams in preparation for decryption.

The black unit 16 performs high speed Ethernet and IP processing on datagrams as a compliment to the processing conducted by the red unit. This processing includes outer header verification, fragmentation, reassembly, as well as route lookup and security association comparison. The black unit 16 is governed by the black I/O processor (BIOP) 32. Collectively, these two components may define the black-side HAIPE processing operation.

Figure 4:
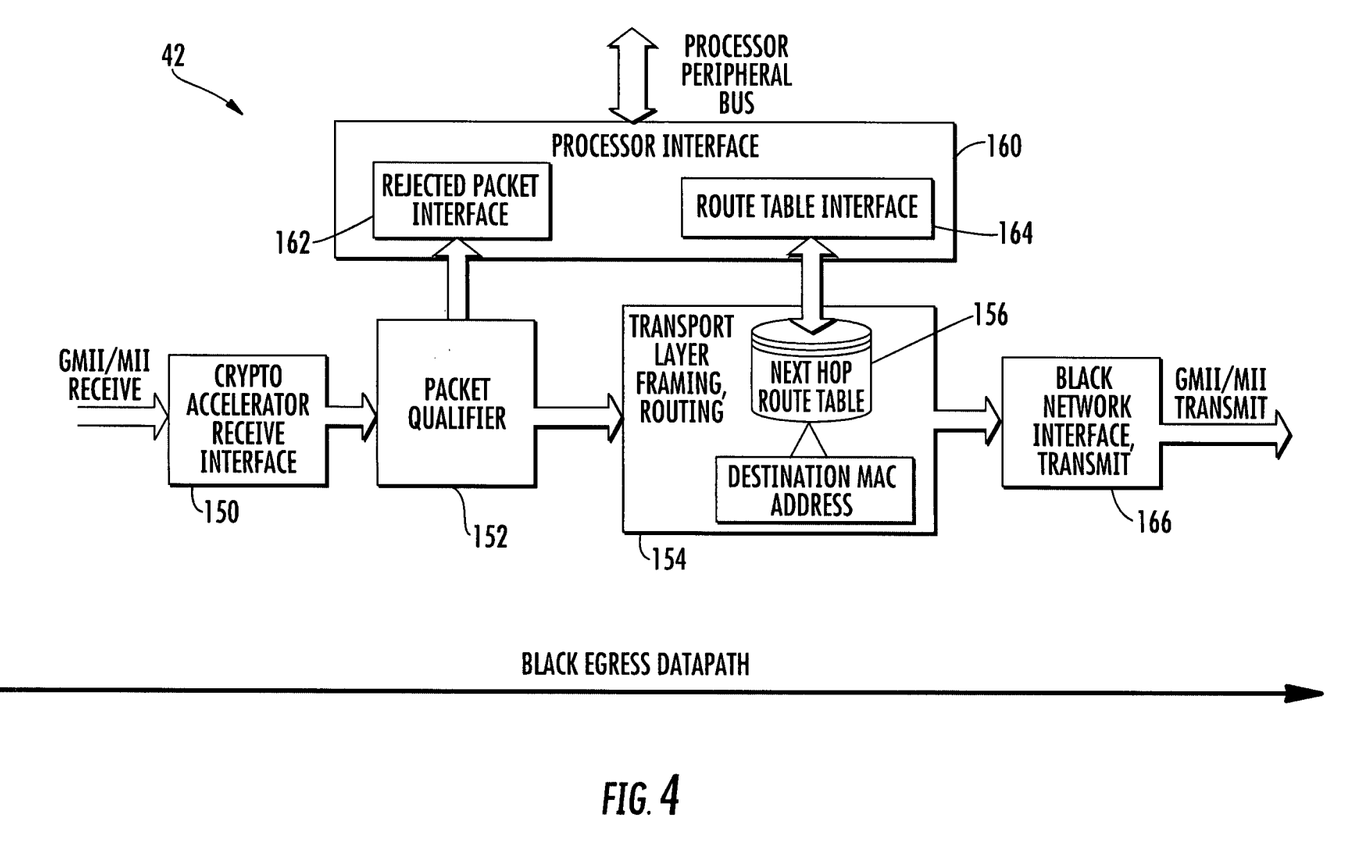
FIG. 4 is a schematic block diagram illustrating features of the egress datapath of the ciphertext or black unit of the encryption/decryption device of FIG. 1.
Figure 5:
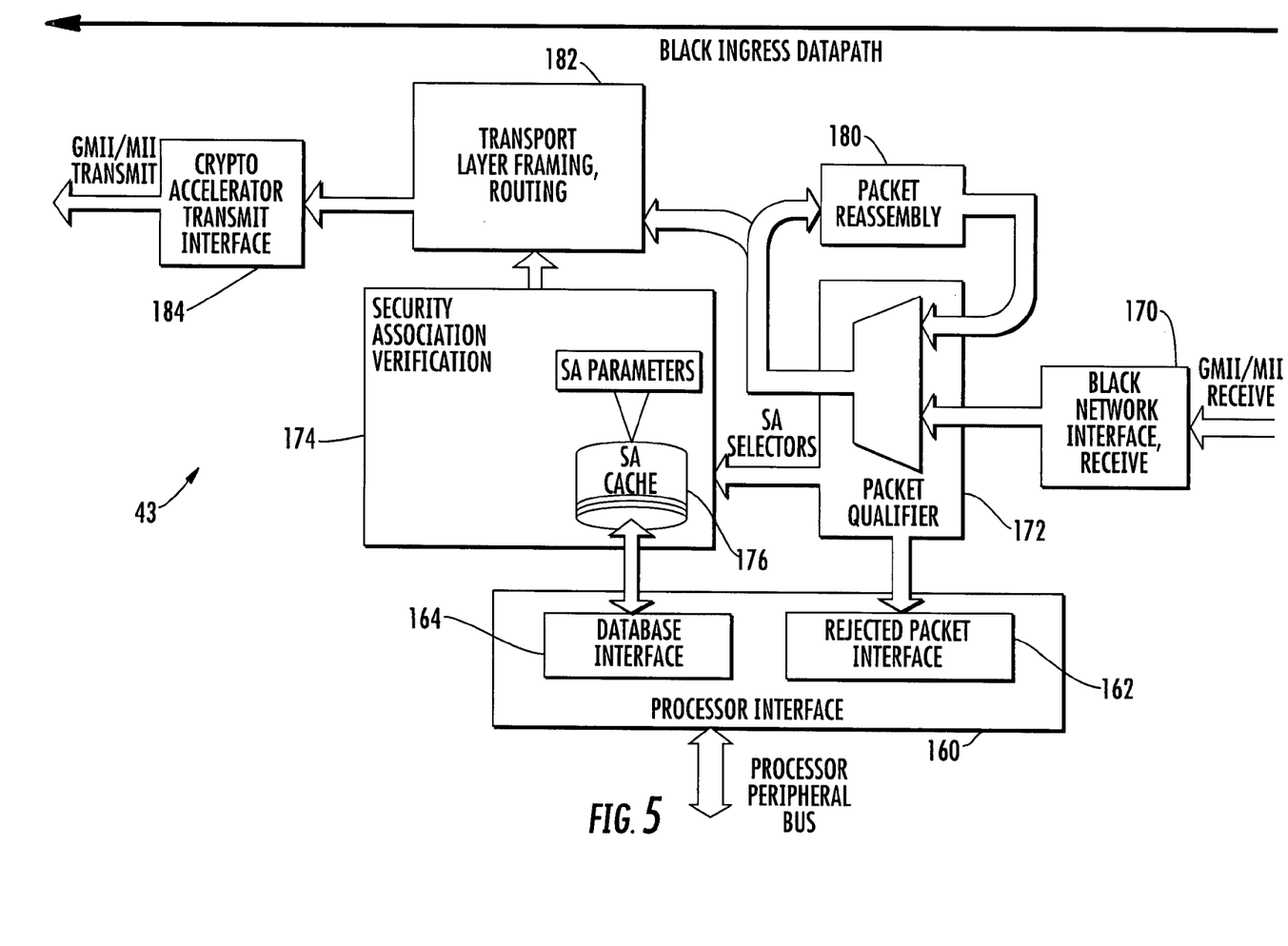
FIG. 5 is a schematic block diagram illustrating features of the ingress datapath of the ciphertext or black unit of the encryption/decryption device of FIG. 1.

Referring now more specifically to FIGS. 4 and 5, the black unit 16 and FPGA 22 may include both ingress and egress directional components 42/43 in a full duplex configuration. Each directional component may have its own set of independent components. The black unit egress directional component group or datapath 42 performs encapsulation of black IP datagrams outbound toward the black network. The sub-components of the black unit egress directional component 42 will now be described.

A Packet Qualifier 152 scans the header field of the outbound black IP datagram, received via Crypto Accelerator Receive Interface 150, to ensure that the packet is a traffic packet of the proper type, and forwards to the BIOP 32 any packets that are of a type that do not pre-qualify for encryption/decryption processing. Processor interface 160 illustratively includes a rejected packet interface 162 and route table interface 164. A Transport layer encapsulation block or Transport Layer Framing, Routing block 154 builds the Ethernet frame for transmission of packet data onto the unprotected black network, and performs next hop lookup, via table 156, and datagram fragmentation including IP header checksum as necessary.

The black unit ingress directional component group or datapath 43 performs decapsulation of CT datagrams inbound from the black unprotected network toward the protected network. The sub-components of the black unit ingress directional component 43 will now be described. A Packet Qualifier 172 scans the header field of the inbound black CT IP datagram, received via Black Network interface Receive block 170, to ensure that the packet is properly addressed and contains an ESP datagram, and forwards to the BIOP 32, via processor interface 160, any packets that are of a type that do not qualify for further processing.

A Packet Reassembly controller or block 180 reassembles inbound fragmented CT datagrams prior to encryption/decryption processing. A Security Association Verification block 174 compares/matches the incoming SPI to an entry in the SA cache 176 to obtain a handle for the decryption key. A Transport Layer Framing, Routing block 182 performs Ethernet framing of black inbound decapsulated ESP datagrams. The directional components may be contained within a common framework, e.g. a monolithic black HAIPE FPGA 22, and they may share some resources including: the Processor Interface 160 which provides a common RIOP interface to both the egress and ingress sections 42/43; and Ethernet media access controller (MAC) Interface, e.g. defined by interface blocks 130, 146, 170 and 184, comprising a dual-channel Ethernet MAC (EMAC) in which each channel contains a full duplex, tri-mode EMAC, for example. One channel serves the interface to the black protected network while the other serves the interface to the cryptographic accelerator FPGA 24.

A method aspect of the invention is directed to making an encryption/decryption device 10 for secure communications between a protected network and an unprotected network. The method may include providing a plaintext unit 12, providing a ciphertext unit 16, and connecting a cryptographic unit 14 between the plaintext unit and the ciphertext unit. Providing the plaintext unit 12 may comprise providing a logic device such as a first programmable logic device (PLD) 20, e.g. an FPGA, for interfacing with the protected network to perform encapsulation of data from the protected network to define outgoing datagrams, and to perform decapsulation of incoming datagrams from the cytographic unit 14. Providing the ciphertext unit 16 may comprise providing a logic device such as a second PLD 22, e.g. an FPGA, for interfacing with the unprotected network to perform routing of incoming encrypted datagrams from the unprotected network to the cryptographic unit 14, and to perform routing of outgoing encrypted datagrams from the cryptographic unit to the unprotected network. Furthermore, connecting the cryptographic unit 14 may include providing the cryptographic unit, such as an FPGA 24, to perform encryption of outgoing datagrams from the plaintext unit 12, and to perform decryption of incoming encrypted datagrams from the ciphertext unit 16 to define the incoming datagrams.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A device for secure communications between a protected network and an unprotected network, the device comprising:
   a first logic device configured as a plaintext unit;
   a second logic device configured as a ciphertext unit; and
   a third logic device configured as a cryptographic unit connected between the plaintext unit and the ciphertext unit;
   the first logic device comprising a red egress directional component configured to interface with the protected network to perform encapsulation of data from the protected network to define outgoing datagrams, and comprising a red ingress directional component operable to perform decapsulation of incoming datagrams from the cryptographic unit;

the second logic device comprising a black ingress directional component configured to interface with the unprotected network to perform routing of incoming encrypted datagrams from the unprotected network to the cryptographic unit, and comprising a black egress directional component operable to perform routing of outgoing encrypted datagrams from the cryptographic unit to the unprotected network;

the third logic device operable to perform encryption of outgoing datagrams from the plaintext unit, and operable to perform decryption of incoming encrypted datagrams from the ciphertext unit to define the incoming datagrams.

2. The device according to claim 1, further comprising:

a plaintext unit input/output processor operable to control the plaintext unit;

a ciphertext unit input/output processor operable to control the ciphertext unit; and a cryptographic unit control processor operable to control the cryptographic unit.

3. The device according to claim 2, further comprising:

a plaintext unit network interface configured to interface the plaintext unit with the protected network; and a ciphertext unit network interface configured to interface the ciphertext unit with the unprotected network.

4. The device according to claim 1, wherein each of the first and second logic devices comprises a field-programmable gate array (FPGA).

5. The device according to claim 4, wherein the cryptographic unit comprises a third FPGA.

6. The device according to claim 1, wherein the plaintext unit, ciphertext unit and cryptographic unit operate in accordance with the High Assurance Internet Protocol Interoperability Specification (HAIPIS).

7. A device for secure communications between a protected network and an unprotected network, the device comprising:

a first logic device configured as a plaintext unit;

a second logic device configured as a ciphertext unit; and a third logic device configured as a cryptographic unit connected between the plaintext unit and the ciphertext unit;

the first logic device comprising a field-programmable gate array (FPGA) comprising a red egress directional component configured for interfacing with the protected network to perform encapsulation of data from the protected network to define outgoing datagrams, and comprising a red ingress directional component operable to perform decapsulation of incoming datagrams from the third logic device;

the second logic unit configured to interface with the unprotected network;

the third logic unit operable to perform encryption of outgoing datagrams from the plaintext unit, and operable to perform decryption of incoming encrypted datagrams.

8. The device according to claim 7, further comprising:

a plaintext unit input/output processor operable to control the plaintext unit;

a ciphertext unit input/output processor operable to control the ciphertext unit; and a cryptographic unit control processor operable to control the cryptographic unit.

9. A method of making an encryption/decryption device for secure communications between a protected network and an unprotected network, the method comprising:

providing a first logic device configured as a plaintext unit;

providing a second logic device configured as a ciphertext unit; and connecting a third logic device configured as a cryptographic unit between the plaintext unit and the ciphertext unit;

providing the first logic device (LD) comprising a red egress directional component for interfacing with the protected network to perform encapsulation of data from the protected network to define outgoing datagrams, and comprising a red ingress directional component to perform decapsulation of incoming datagrams from the cryptographic unit;

providing the second LD comprising a black ingress directional component for interfacing with the unprotected network to perform routing of incoming encrypted datagrams from the unprotected network to the cryptographic unit, and comprising a black egress directional component to perform routing of outgoing encrypted datagrams from the cryptographic unit to the unprotected network; and connecting the third logic device to perform encryption of outgoing datagrams from the plaintext unit, and to perform decryption of incoming encrypted datagrams from the ciphertext unit to define the incoming datagrams.

10. The method according to claim 9, further comprising:

providing a plaintext unit input/output processor to control the plaintext unit;

providing a ciphertext unit input/output processor to control the ciphertext unit; and providing a cryptographic unit control processor to control the cryptographic unit.

11. The method according to claim 10, further comprising:

providing a plaintext unit network interface to interface the plaintext unit with the protected network; and providing a ciphertext unit network interface to interface the ciphertext unit with the unprotected network.

12. The method according to claim 9, wherein providing each of the first and second LDs comprises providing a field-programmable gate array (FPGA).

13. The method according to claim 12, wherein providing the cryptographic unit comprises providing a third FPGA.

* * * * *